(12) United States Patent
Korkishko et al.

(10) Patent No.: US 9,697,382 B2
(45) Date of Patent: Jul. 4, 2017

(54) METHOD AND SYSTEM FOR PROVIDING SECURITY POLICY FOR LINUX-BASED SECURITY OPERATING SYSTEM

(75) Inventors: Tymur Korkishko, Suwon-si (KR); Kyung-Hee Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 422 days.

(21) Appl. No.: 12/776,826

(22) Filed: May 10, 2010

(65) Prior Publication Data

US 2010/0287598 A1    Nov. 11, 2010

(30) Foreign Application Priority Data

May 8, 2009    (KR) ........................ 10-2009-0040417

(51) Int. Cl.
G06F 21/00    (2013.01)
G06F 21/62    (2013.01)
G06F 21/53    (2013.01)
G06F 21/54    (2013.01)

(52) U.S. Cl.
CPC .......... G06F 21/6281 (2013.01); G06F 21/53 (2013.01); G06F 21/54 (2013.01)

(58) Field of Classification Search
CPC ..... H04L 63/20; G06F 21/6281; G06F 21/53; G06F 21/54
USPC ............................................................ 726/1
See application file for complete search history.

(56) References Cited

U.S. PATENT DOCUMENTS

| | | |
|---|---|---|
| 2005/0138416 A1 | 6/2005 | Qian et al. |
| 2008/0141338 A1* | 6/2008 | Kim et al. ............... 726/1 |
| 2008/0184335 A1* | 7/2008 | Zhang et al. ............ 726/1 |
| 2008/0209501 A1* | 8/2008 | Mayer et al. ............ 726/1 |
| 2009/0150886 A1* | 6/2009 | Subramanian ........... G06F 8/71 718/100 |
| 2009/0158385 A1* | 6/2009 | Kim et al. ............... 726/1 |

FOREIGN PATENT DOCUMENTS

| | | |
|---|---|---|
| KR | 1020010105116 | 11/2001 |
| KR | 1020050062368 | 6/2005 |
| KR | 1020080051972 | 6/2008 |

OTHER PUBLICATIONS

Korean Office Action dated Jul. 16, 2015 issued in counterpart application No. 1020090040417, 12 pages.
Korean Office Action dated Apr. 21, 2016 issued in counterpart application No. 10-2009-0040417, 6 pages.

* cited by examiner

*Primary Examiner* — Brandon Hoffman
*Assistant Examiner* — Thong Truong
(74) *Attorney, Agent, or Firm* — The Farrell Law Firm, P.C.

(57) ABSTRACT

A system for providing security policy for a Linux-based security operating system, which includes a template policy module configured to set an authority using policy information of a downloaded application so that the template policy module can set an access control rule for accessing a system resource of the application, a base policy module executing the access control rule for the system resource in accordance with the access control rule set by the template policy module, and a template policy module editor generating a custom application for the corresponding application using information output from the template policy module.

10 Claims, 6 Drawing Sheets

METHOD AND SYSTEM FOR PROVIDING SECURITY POLICY FOR LINUX-BASED SECURITY OPERATING SYSTEM

PRIORITY

This application claims priority under 35 U.S.C. §119(a) to an application filed in the Korean Intellectual Property Office on May 8, 2009 and assigned Serial No. 10-2009-0040417, the content of which is incorporated herein by reference.

BACKGROUND OF THE INVENTION

1. Field of the Invention

The present invention relates to a Linux-based system having strengthened security, and more particularly to a method and a system for providing a security policy for downloaded applications in a security operating system.

2. Description of the Related Art

Presently, as the role of the Internet is extended from merely providing information to, or sharing information with intranet networks, electronic commerce, and the like, the need to protect against hacking is of increased importance. Hacking is an invasion of privacy, may cause the destruction of property, tarnish a corporation's image, compromise corporate trade secrets, interrupt service, and the like, and the scale of damage caused by hacking has been increasing at a high rate. Particularly, in the case of a corporation, whether the corporation can defend itself against hacking is vital to its survival.

Recently, with the development of the Internet, it has become possible to access personal computers and networks throughout the world. In such environments, the accessing of data from remote locations is convenient, but sensitive data may be exposed to unauthorized users, and malicious attacks may frequently occur. Accordingly, security technologies of application layers, such as encryption, firewalls, invasion detecting systems, and the like, for safe sharing and use of information have been developed to protect information of networks or servers. However, such security technologies of application layers have their own vulnerabilities and drawbacks such that it is difficult to cope with privacy violations by otherwise authorized users, misuse/abuse of authority, and attack through system hacking.

In order to solve this problem and to implement a Trusted Computing Base (TCB), research for a security operating system has been ongoing, and a representative security operating system may be SELinux (Security Enhanced Linux). SELinux is a security operating system developed by the National Security Agency (NSA) through application of a Flux Advanced Security Kernel (Flask) structure to Linux, and provides a structure that executes diverse access control policies, such as Type Enforcement (TE), role based access control, Multi-Level Security (MLS), and the like. SELinux also performs access control of not only files and device files but also various resources in the system, such as processes, signals, memory, and the like. SELinux also minimizes the range of damage through minimum authority allocation, and prevents the execution of malicious code. In structure, SELinux separates a policy decision module and a policy execution module from each other to provide flexibility to the security policy. On the other hand, a general UNIX operating system uses a Discretionary Access Control (DAC) method as an access control method. Also, in Trusted Computer System Evaluation Criteria (TCSEC), the same concept as the discretionary access control policy is defined as DAC. That is, a method of limiting the access of an object based on the discretion of the subject or a group to which the subjects belong is defined as DAC.

The biggest security problem in the DAC method is that the authority of a super user (i.e., root) is too great. That is, a super user can set all the environment variables of the system, and can delete all processes. Accordingly, once a hacker becomes a super user using a vulnerability, they can perform all the functions of a super user.

According to the DAC method, as many system files are changed or the kernel becomes larger and has many support functions, the kernel becomes modularized, and a part of the kernel performs a task after a module is inserted into the kernel. Accordingly, a serious problem may occur as malicious code is inserted into the kernel.

Although SELinux can perform more enhanced access control, there is a high possibility that, due to a type of a downloaded application that means a group having the same security attribute and Boolean designation, a special control element in SELinux policy controlling what part of policy is applied to an application, which are given during installation of the downloaded application, the given designation collides with the existing designation, and thus it is difficult for general users to set the security policy for the downloaded application to suit the users' purposes.

SUMMARY OF THE INVENTION

Accordingly, the present invention has been made to solve the above-mentioned problems occurring in the prior art, and the present invention provides a method and a system for providing security policy for a Linux-based security operating system, which enables a user having no specialized knowledge in security to easily set the security policy through an improvement in the complexity of the security policy.

In accordance with an aspect of the present invention, there is provided a system for providing a security policy for a Linux-based security operating system, which includes a template policy module configured to set using policy information of a downloaded application so that the template policy module can set an access control rule for accessing a system resource of the application; a base policy module executing the access control rule for the system resource in accordance with the access control rule set by the template policy module; and a template policy module editor generating a custom application for the corresponding application using information output from the template policy module.

In accordance with another aspect of the present invention, there is provided a method of providing security policy for a Linux-based security operating system, which includes acquiring a policy manifest and installation information of a downloaded application using policy information of the application; generating an application policy module based on the acquired policy manifest and installation information; and managing the generated application policy module.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE PRESENT INVENTION

Hereinafter, embodiments of the present invention will be described with reference to the accompanying drawings. In the following description, various specific definitions found in the following description are provided only to aid in the general understanding of the present invention, and it is apparent to those skilled in the art that the present invention can be implemented without such definitions.

For help in completely understanding the present invention, the basic principle of the present invention will now be described. A Linux-based terminal according to the present invention is a device that can transmit/receive data, and it would be apparent that the terminal could be applied to all information communication appliances, such as a mobile communication terminal, a digital broadcasting terminal, a Personal Digital Assistant (PDA), and the like, multimedia appliances, and applications thereof.

Also, in the description of the present invention, the term "module" means a unit that processes a specified function or operation, and can be implemented by hardware, software, or combination thereof.

Figure 1:
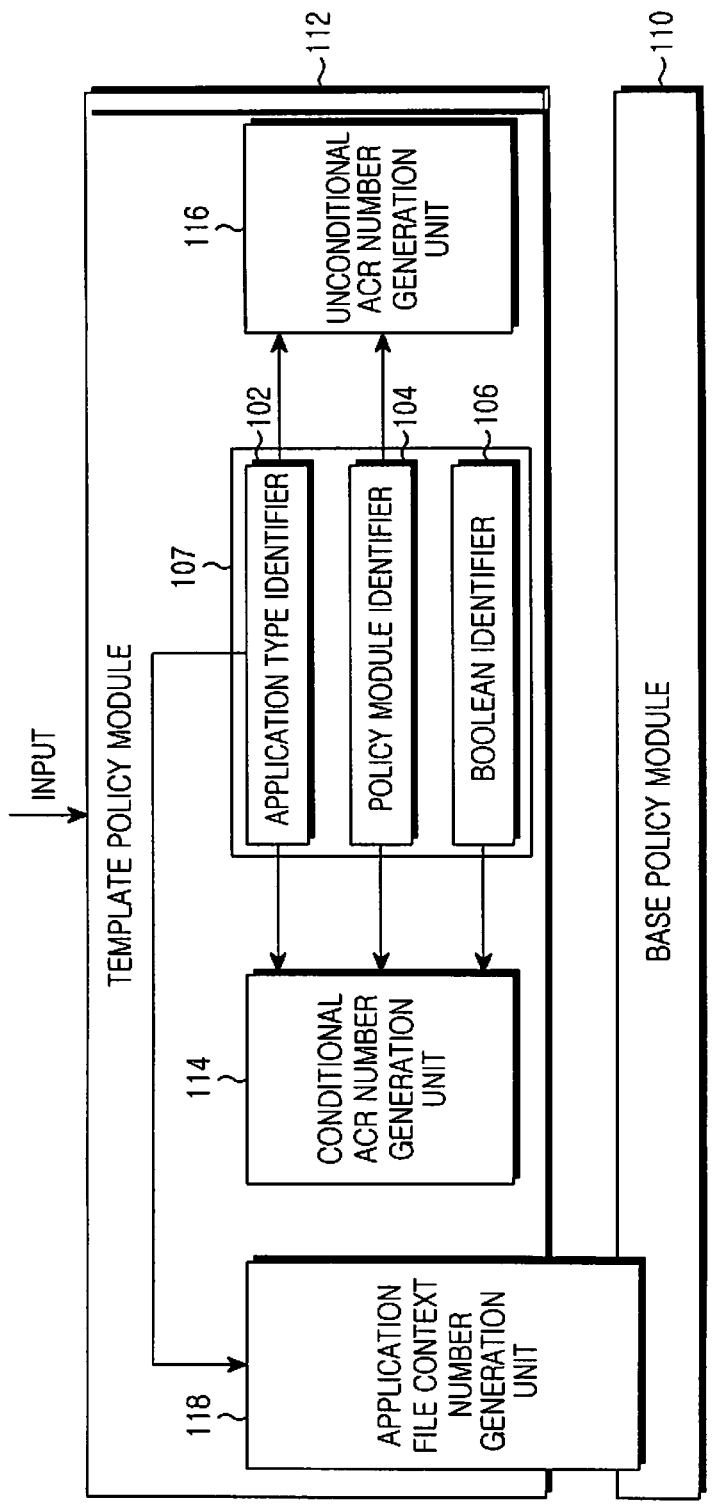
FIG. 1 illustrates the configuration of a sample Linux system used to set security policy according to the present invention.

FIG. 1 illustrates the configuration of an example of a Linux system used to set security policy according to the present invention.

Referring to FIG. 1, the Linux system includes a template policy module 112 and a base policy module 110.

The template policy module 112 is configured to set permissions using policy information of an application downloaded from a remote location.

More specifically, the template policy module 112 includes a conditional Access Control Rule (ACR) generation unit 114 and an unconditional ACR generation unit 116, which have different inputs in accordance with the existence/nonexistence of a Boolean identifier among policy constituent elements included in the policy information of the downloaded application, and an application file context number generation unit 118 having an application component path defined during generation of the downloaded application, security context and Type Enforcement (TE) technical terms.

The template policy module 112 includes a detection unit 107, which divides the downloaded application policy information into an application type identifier indicating the attribute of the application, a policy module identifier defined in the application, and a Boolean identifier which has a true or false value and can flexibly apply an authority of permitting/interrupting the conditional access control rule for an Access Control Interface (ACI) to accessible resources in the system, and outputs the divided identifiers to the conditional ACR generation unit 114 and the unconditional ACR generation unit 116, respectively.

Here, the detection unit 107 includes an application type identifier unit 102, a policy module identifier unit 104, and a Boolean identifier unit 106, to which the policy information of the downloaded application is input, respectively.

On the other hand, in the application file context number generation unit 118 having the application component path defined during generation of the downloaded application, the security context and the Type Enforcement (TE) technical terms, the security context of the corresponding application component is stored in the form of a file after the corresponding application is installed in the system, and one application file context has the following syntax description form.

/tpm_file_path_xxxxxxx_yyyyyyy-tpm_user_xxxxxxx:
tpm_role_zzzzz Zz:tpm_app_exec_vvvvvvv_t where xxxxxx, yyyyyyy, zzzzzzz, vvvvvvv—are the templates for further customization.

The Boolean identifier has the following syntax description form.

If(tpm_xxxxxxx_network_b){base_allow_network_
for_app(tpm_app_yyyyyy_t)}

In this case, the Boolean identifier sets the conditional policy of the accessible resources in the Linux system. For example, if the conditional policy is provided, it has syntax in the form of tpm_app_yyyyyy_t type identifier, and in this case, it has a true value.

The above-described syntax form permits access to the resources in the system, and the resources include an application Access Control Interface (ACI), a network ACI, a storage ACI, a telephony ACI, and other conditional ACIs.

Figure 2:
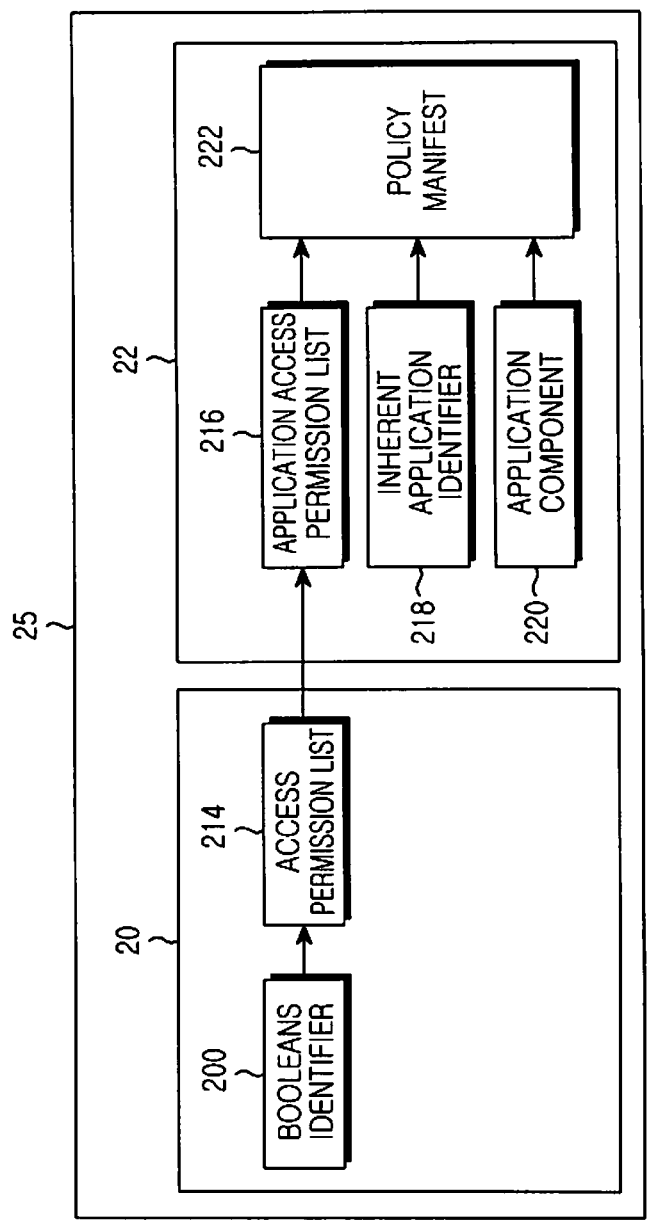
FIG. 2 illustrates a data flow diagram in a conditional Access Control Rule (ACR) generation unit of a template policy module in a Linux system used to set security policy according to the present invention.

FIG. 2 illustrates a data flow in a conditional ACR generation unit of a template policy module in a Linux system used to set security policy according to the present invention.

The conditional ACR generation unit 25 includes an access permission list 214 to which application access permission list files from the Boolean identifier 212 are input. This refers to authorized entities 20, e.g. a camera, a phone, a network, and the like.

Also, the conditional ACR generation unit 25 includes an application access permission list input from the access permission list 214, an inherent identifier 218 of the corresponding application, and a component 220, which are provided in a downloaded application provider 22.

Accordingly, the conditional ACR generation unit 25 can acquire the policy manifest 222 of the corresponding application.

The policy manifest 222, which is generated from the downloaded application provider, includes information on the corresponding application component, an inherent application identifier, and an application access permission list.

Here, the access permission list is a list in which access rules given to the respective applications are recorded.

The application component is composed of executable data, configuration files, temporary files, and directories. The application component also includes information about executable file names, and such information is provided in an application installation path, and has the following syntax description form.

For application executable:
Exe: file /$INSTALL_PATH$/app_name
For application components (non-executable):
Comp: file /$INSTALL_PATH$/com_name1
Comp: file /$INSTALL_PATH$/com_name2
. . .
Comp: file /$INSTALL_PATH$/com_nameN where $INSTALL_PATH$—is template for further customization with actual installation path of the application component.

Here, the inherent identifier 218 of the application is distinguished from other applications, and the application identifier is configured as a partial result of an application message authority code using a secret key of the application provider.

Also, the application access permission list 216 is provided by the access permission list 214 of the authorized entities, e.g. a camera, a network, a phone, and the like, and is supported by the template policy module 25.

The authorized entity corresponds to the permission name and the Boolean identifier 212 on the template, and the permission list 214 has the following syntax description form.

| Boolean identifier | Permission Name |
|---|---|
| Tpm_xxxxxxx_network_b | Network access |
| Tpm_xxxxxxx_camera_b | Camera access |
| Tpm_xxxxxxx_sms_b | Send SMS |
| Tpm_xxxxxxx_call_b | Place phone calls |

Also, the application permission list 216 has the following syntax description form.
Perm_name: Network access Required: Yes
Perm_name: Camera access Required: Yes
Perm_name: Send SMS
Perm_name: Place call For example, the application provider 22 describes the application permission for accessing the network and camera device in the following syntax form.
Exe: file /$INSTALL_PATH$/app_name
Comp: file /$INSTALL_PATH$/app_name1
Comp: file /$INSTALL_PATH$/app_name2
. . .
Comp: file /$INSTALL_PATH$/appp_nameN
Perm_name: Network access Required: Yes
Perm_name: Camera access Required: Yes
Perm_name: Send SMS
Perm_name: Place call
. . .
AppID: 6dgGHd783

Figure 3:
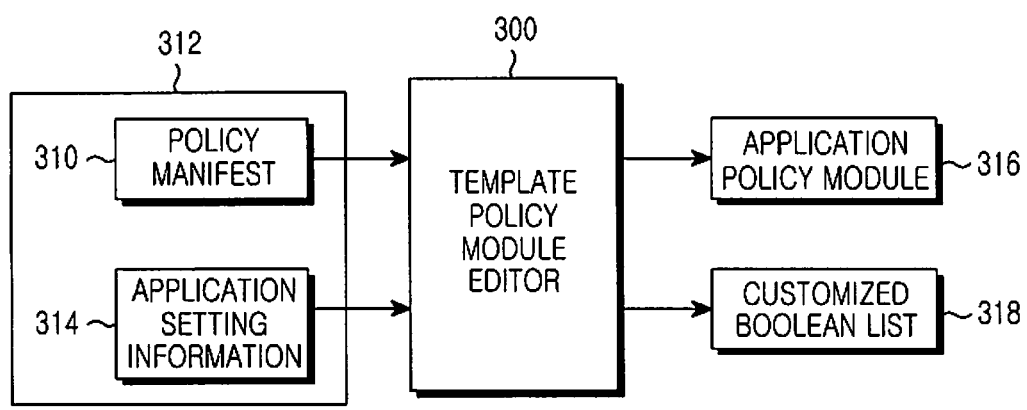
FIG. 3 illustrates the configuration of a template policy module editor in a Linux system used to set security policy according to the present invention.

FIG. 3 illustrates the configuration of a template policy module editor in a Linux system used to set security policy according to the present invention.

The template policy module editor 300 generates a custom application of the corresponding application using information output from the template policy module.

For this, the template policy module editor 300 receives a policy manifest 310 and application setting information 314 from a template module 312.

That is, the template policy module editor 300 receives the input policy manifest 310 and the application setting information 314 through a binary template policy module (not illustrated).

In this case, the application setting information 314 means the current setting path of the corresponding application.

Accordingly, the template policy module editor 300 customizes the template using the binary template policy module, the received application policy manifest and the application installation information, and generates a corresponding application policy module 316 and a customized Boolean list 318 of the respective applications.

Hereinafter, a method of providing security policy for a Linux-based security operating system according to the present invention using a system for providing security policy for a Linux-based security operating system according to an embodiment of the present invention will be described in detail with reference to FIGS. 4, 5, and 6.

Figure 4:
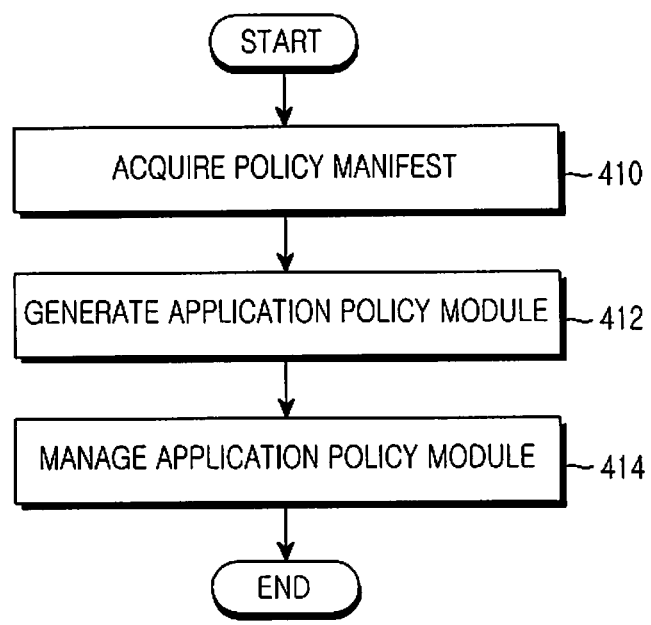
FIG. 4 is a flowchart, which illustrates a method of providing security policy for a Linux-based security operating system according to an embodiment of the present invention.

FIG. 4 is a general flowchart illustrating a method of providing security policy for a Linux-based security operating system according to an embodiment of the present invention.

Referring to FIG. 4, the application policy manifest and install information are acquired using the policy information of the downloaded application in step 410.

This is to acquire the access rule capable of accessing the resources in the system from the template policy module of the security policy providing system for a Linux-based security operating system.

In step 412, a customized policy module of the corresponding application is generated using the template policy module editor based on the acquired policy manifest and install information.

In step 414, the generated application policy module is managed.

Hereinafter, the method of providing security policy for a Linux-based security operating system according to an embodiment of the present invention will be described in detail with reference to FIG. 5.

Figure 5:
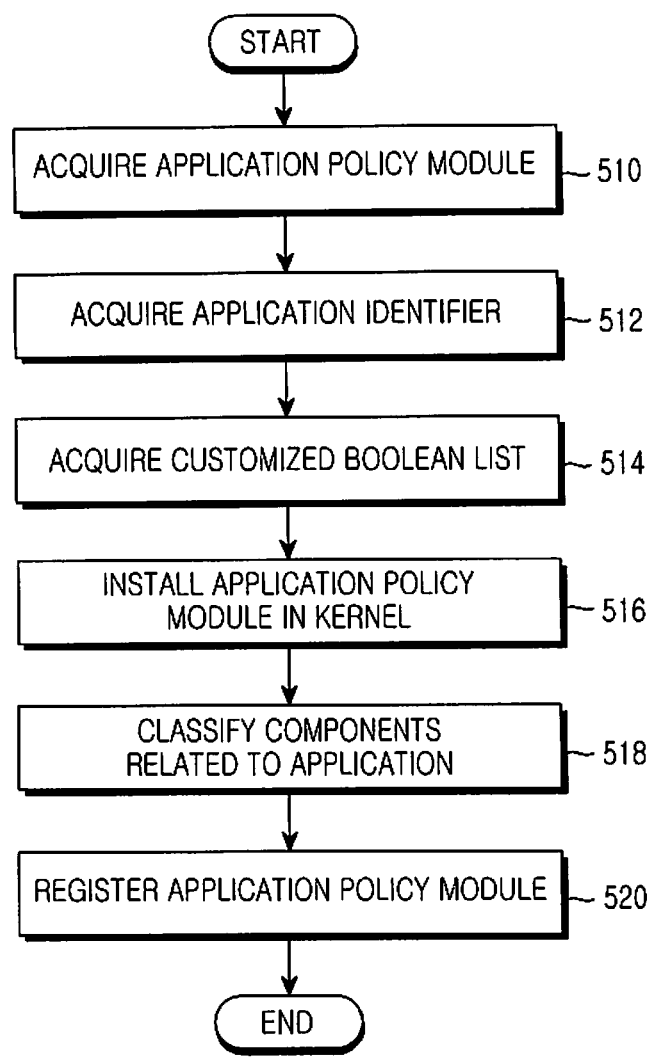
FIG. 5 is a detailed flowchart, which illustrates a method of installing an application generated by an application policy module in a Linux system in a method of providing security policy for a Linux-based security operating system according to an embodiment of the present invention.

FIG. 5 is a detailed flowchart illustrating a method of installing an application generated by an application policy module in a Linux system in a method of providing security policy for a Linux-based security operating system according to an embodiment of the present invention.

Referring to FIG. 5, the application policy module of the corresponding application is acquired from the template policy module in step 510.

The corresponding identifier is acquired from the policy manifest of the acquired application policy module in step 512, and the customized Boolean list output from the template policy module editor is acquired in step 514.

In this case, the policy manifest is generated from the provider of the initially downloaded application, and generally refers to information on the corresponding application component, an inherent application identifier, and an application access permission list.

Also, the application component is composed of executable data, configuration files, temporary files, and directories, and includes information on executable names. Such information is provided from an application installation path.

Then, in step 516, the application policy module generated in the kernel is installed depending on whether the access control rule given to the kernel through the acquired Boolean list is satisfied.

In step 518, labeling of the respective components related to the corresponding installed application is performed.

The corresponding labeled application is registered in the form of setting the authority to the resources in the system in step 520.

Figure 6:
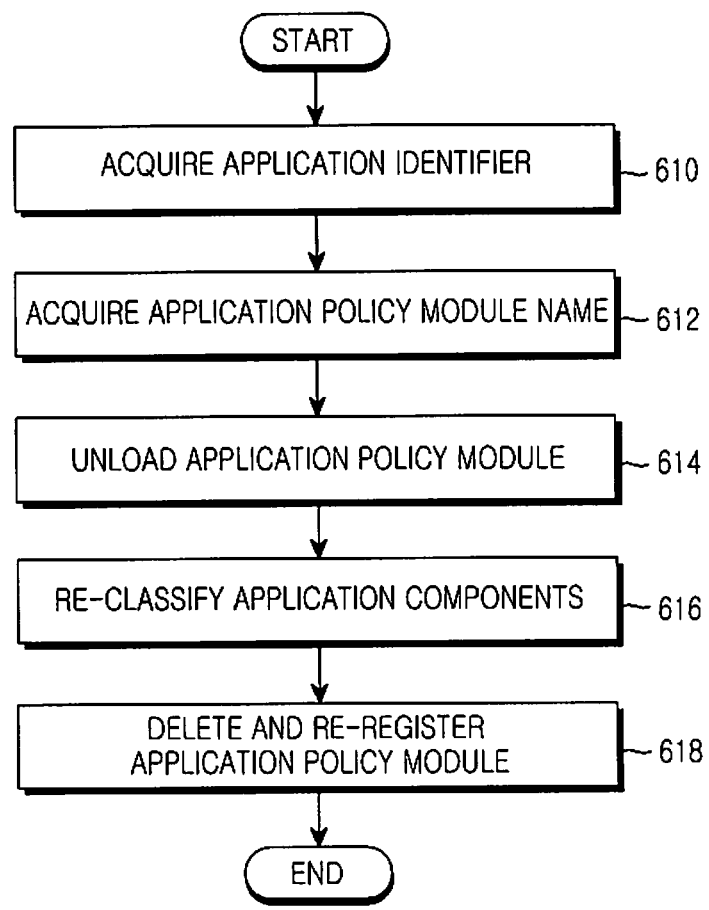
FIG. 6 is a detailed flowchart, which illustrates a method of deleting an application generated by an application policy module in a Linux system in a method of providing security policy for a Linux-based security operating system according to an embodiment of the present invention.

FIG. 6 is a detailed flowchart illustrating a method of deleting an application generated by an application policy module in a Linux system in a method of providing security policy for a Linux-based security operating system according to an embodiment of the present invention.

Referring to FIG. 6, in step 610, the identifier of the corresponding application is acquired from the policy manifest of the application policy module acquired in step 412 of FIG. 4.

Then, the name of the corresponding application is acquired in step 612, and the policy module of the corresponding application that is registered in the template policy module in the Linux system is unloaded using the acquired application identifier and the name thereof in step 614.

The labeling of the components of the unloaded application policy module is re-performed in step 616.

In this case, the component is composed of configuration files, temporary files, and directories, and also includes information on the executable file name.

Then, in step 618, the deletion of the application policy module registered in the template policy module in the Linux system in step 616 is performed.

As described above, according to the method and system for providing security policy for a Linux-based security operating system according to the present invention, the access control function of downloaded applications in the system is strengthened, and an operating system suitable for the purpose of the Linux-based system can be configured.

While the invention has been shown and described with reference to certain embodiments thereof, it will be understood by those skilled in the art that various changes in form and details may be made therein without departing from the spirit and scope of the invention as defined by the appended claims.

What is claimed is:

1. A system for providing security policy for a Linux-based security operating system, comprising:
   a template policy module configured to set authority using policy information of a downloaded application and set an access control rule for accessing a system resource of the downloaded application based on the authority;
   a base policy module configured to execute the access control rule for the system resource in accordance with the access control rule set by the template policy module; and
   a template policy module editor configured to acquire policy manifest and installation information using the policy information, and generate a custom application corresponding to the downloaded application using the policy manifest and the installation information,
   wherein the template policy module editor generates the custom application directly after acquiring the policy manifest and the installation information,
   wherein the policy manifest is generated from a provider of the downloaded application, and
   wherein the custom application is different from the downloaded application.

2. The system as claimed in claim 1, wherein the template policy module comprises:
   a conditional and unconditional Access Control Rule (ACR) number generation unit having different inputs in accordance with existence or nonexistence of a Boolean identifier among policy constituent elements included in the policy information of the downloaded application; and
   an application file context number generation unit having an application component path defined during generation of the downloaded application, security context and Type Enforcement (TE) technical terms.

3. The system as claimed in claim 1, wherein the downloaded application policy information includes:
   an application type identifier indicating an attribute of the application;
   a policy module identifier defined in the application; and
   a Boolean identifier which has a true or false value and can flexibly apply an authority of permitting or interrupting a conditional ACR for an Access Control Interface (ACI) to accessible resources in the system.

4. The system as claimed in claim 2, wherein the conditional ACR number generation unit acquires a list of application permission list files from the Boolean identifier, and reads out the policy manifest using the acquired list, inherent identifiers of the respective applications, and the policy information.

5. The system as claimed in claim 1, wherein the template policy module editor comprises a binary template policy module that receives the policy manifest of the corresponding application and a current installation path.

6. A method of providing security policy for a Linux-based security operating system, comprising the steps of:
   acquiring policy manifest and installation information of a downloaded application using policy information of the application;
   generating an application policy module corresponding to the downloaded application based on the policy manifest and the installation information; and
   managing the generated application policy module,
   wherein generating the application policy module includes generating the application policy module directly after acquiring the policy manifest and the installation information,
   wherein the policy manifest is generated from a provider of the downloaded application, and
   wherein the application policy module is different from the downloaded application.

7. The method as claimed in claim 6, wherein acquiring the policy manifest comprises:
   receiving policy information of an application program so that a system resource access control rule for the downloaded application can be set;
   acquiring application permission list files from a Boolean identifier among policy constituent elements included in the policy information; and
   acquiring an inherent identifier of the application.

8. The method as claimed in claim 6, wherein the downloaded application policy information includes:
   an application type identifier indicating an attribute of the application;
   a policy module identifier defined in the application; and
   a Boolean identifier which has a true or false value and can flexibly apply an authority of permitting or interrupting a conditional ACR for an Access Control Interface (ACI) to accessible resources in the system.

9. The method as claimed in claim 6, wherein managing the application policy module comprises:
   acquiring the corresponding identifier from the policy manifest of the generated application policy module;
   acquiring a customized Boolean list;
   installing the application policy module generated in a kernel according to whether an access control rule given to the kernel through the acquired Boolean list is satisfied;
   labeling components related to the installed application module; and
   registering the corresponding labeled application.

10. The method as claimed in claim 6, wherein managing the application policy module comprises:
  acquiring a corresponding identifier and a name thereof from the policy manifest of the generated application policy module;
  unloading the application policy module corresponding to the acquired identifier and name from a database;
  labeling components related to the unloaded application policy module; and
  deleting the generated application policy module.

* * * * *